United States Patent
Chan et al.

(10) Patent No.: US 9,921,978 B1
(45) Date of Patent: Mar. 20, 2018

(54) SYSTEM AND METHOD FOR ENHANCED SECURITY OF STORAGE DEVICES

(71) Applicant: FireEye, Inc., Milpitas, CA (US)

(72) Inventors: Eric Chan, Newark, CA (US); Osman Abdoul Ismael, Palo Alto, CA (US); Gregory J. Snyder, Palo Alto, CA (US)

(73) Assignee: FireEye, Inc., Milpitas, CA (US)

( * ) Notice: Subject to any disclaimer, the term of this patent is extended or adjusted under 35 U.S.C. 154(b) by 594 days.

(21) Appl. No.: 14/536,498

(22) Filed: Nov. 7, 2014

Related U.S. Application Data (60) Provisional application No. 61/902,102, filed on Nov. 8, 2013.

(51) Int. Cl.
*G06F 21/00* (2013.01)
*G06F 12/14* (2006.01)
*G06F 21/31* (2013.01)

(52) U.S. Cl.
CPC .......... *G06F 12/1466* (2013.01); *G06F 21/31* (2013.01)

(58) Field of Classification Search
CPC .............................. G06F 12/1466; G06F 21/31
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Marchette, David J., "Computer Intrusion Detection and Network Monitoring: A Statistical Viewpoint", ("Marchette"), (2001).

(Continued)

*Primary Examiner* — Kendall Dolly
(74) *Attorney, Agent, or Firm* — Rutan & Tucker, LLP (57) ABSTRACT

A storage device features a processor and a random number generation which are communicatively coupled to a memory. The memory comprises an access control logic that is configured to (i) transmit a first message that comprises information associated with a random number generated by the random number generator and a first keying material, (ii) receive a second message in response to the first message, the second message comprises information generated using at least the random number, (iii) recover information from the second message, the recovered information comprises information generated using at least pre-stored keying material and a return value being based on the random number, (iv) compare the return value from the recovered information with the random number, and (v) alter an operating state of the storage device from a locked state to an unlocked state upon the return value matching the random number, the unlocked state allows one or more devices to control storage device including accessing stored content within the storage device.

19 Claims, 5 Drawing Sheets

(56) References Cited

U.S. PATENT DOCUMENTS

| | | |
|---|---|---|
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |

(56) References Cited

U.S. PATENT DOCUMENTS

| | | |
|---|---|---|
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0149730 A1* | 7/2005 | Aissi ................. G06F 21/31 713/168 |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van De Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |

(56) References Cited

U.S. PATENT DOCUMENTS

| | | |
|---|---|---|
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0063802 A1* | 3/2009 | Johnson .......... G06F 21/31 711/164 |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0054278 A1 | 3/2010 | Stolfo et al. |
| 2010/0115621 A1 | 5/2010 | Staniford et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0281541 A1 | 11/2010 | Stolfo et al. |
| 2010/0281542 A1 | 11/2010 | Stolfo et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |

(56) References Cited

U.S. PATENT DOCUMENTS

| | | |
|---|---|---|
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096025 A1 | 4/2015 | Ismael |

FOREIGN PATENT DOCUMENTS

| | | |
|---|---|---|
| WO | 02/23805 A2 | 3/2002 |
| WO | 02/006928 A2 | 8/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2013/067505 A1 | 5/2013 |

OTHER PUBLICATIONS

Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul , "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.jsp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

(56) References Cited

OTHER PUBLICATIONS

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen").

Cisco "Intrusion Prevention for the Cisco ASA 5500-x Series" Data Sheet (2012).

Cisco, Configuring the Catalyst Switched Port Analyzer (SPAN) ("Cisco"), (1992-2003).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek.   .com/microsofts-honeymonkeys-show-patching-wi/167600716 [retrieved on Sep. 29, 2014].

Heng Yin et al, Panorama: Capturing System-Wide Information Flow for Malware Detection and Analysis, Research Showcase @ CMU, Carnegie Mellon University, 2007.

Hjelmvik, Erik , "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King").

Krasnyansky, Max , et al., Universal TUN/TAP driver, available at https://www.kernel.org/doc/Documentation/networking/tuntap.txt (2002) ("Krasnyansky").

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

\* cited by examiner

SYSTEM AND METHOD FOR ENHANCED SECURITY OF STORAGE DEVICES

This Application claims the benefit of priority on U.S. Provisional Application No. 61/902,102 filed Nov. 8, 2013, the entire contents of which are incorporated by reference herein.

FIELD

Embodiments of the disclosure relate to the field of data security, and in particular, to a system and method directed to enhancing security of one or more storage devices such as hard disk drives.

GENERAL BACKGROUND

Over the past few years, many companies have recognized that hard disk drives and other types of data storage devices are highly susceptible to attack. Currently, some types of electronic devices, such as laptop computers for example, rely on password-entry security processes to control access to its hard disk drive. However, other types of electronic devices are unable to effectively utilize password-entry security processes.

For instance, generally speaking, web servers are in constant operation (24×7). However, on occasion, a particular server undergoes a reboot operation (e.g. power-down immediately followed by a power-on operation), which are normally conducted in the early morning hours to avoid disruption in the services offered by the server. During the reboot operation, in accordance with the ATA/ATAPI Command Set-2 specification (2009), a security unlock command is sent to the drive(s) on the server, where the security unlock command includes the password in plain text to unlock the drive. Given that this password is susceptible to an interloper who may try to monitor communications with the server (referred to as "tapping"), administrative level oversight is needed. This administrative oversight is costly and highly inconvenient as this typically requires information technology (IT) personnel to participate in a password-entry security process every time the server is forced to reboot.

Furthermore, due to remoteness of many servers, password-entry security processes are susceptible to the interloper who may intercept password information provided from the server after reboot and, with knowledge of the password, bypass all the security features of these drives in order to recover proprietary software code and other stored content within a hard drive of the server.

Hence, to provide better security, especially for servers and other remotely located storage devices, a security mechanism is needed with some capability to mitigate any attempts to "tap" and access exchanged communications in response to reboot or other state-changing events that may require authorization before granting access control.

BRIEF DESCRIPTION OF THE DRAWINGS

The invention may best be understood by referring to the following description and accompanying drawings that are used to illustrate embodiments of the disclosure.

DETAILED DESCRIPTION

Embodiments of the disclosure are directed to a security mechanism that is adapted to automatically conduct an authorization process between one or more storage devices and a data processing device configured to collectively manage the storage device(s). This secure authorization process relies on the communicative devices having access to the same keying material, which may be used to obfuscate information within exchanged Challenge-Response messages and/or automatically recover particular information from these messages. The recovery of this particular information may be used to identify and authorize access by the requesting device to one or more storage devices, which occurs without user intervention and in a secure manner. Such access may involve administrative-level access to particular stored content within the storage device(s), control of storage space configurations associated with the storage device(s), or the like.

I. General Discussion

In general, according to one embodiment of the disclosure, in response to a "state-changing" event, namely an event that is designed to change an operating state of a storage device such as supplying or re-supplying a level of power to a storage device for placement into an active operating state for example (e.g. reboot, initial power up, wake-up from sleep mode, timer interrupt, etc.), logic within the storage device generates a random number that is stored within an internal data store. In response to a data processing device requesting access to the storage device, the random number is obfuscated prior to being transmitted as part of a Challenge message to the data processing device. The Challenge message is one of the transmissions conducted during this authorization process.

More specifically, at least the random number and keying material are obfuscated, where the resultant information (referred to herein as "challenge data") is provided as part of the Challenge message. At this time, the storage device is currently in its default (locked) state that precludes unauthorized devices, such as the data processing device for example, from having any control of the storage device including accessing stored content.

According to one embodiment of the disclosure, prior to transmission, the keying material and the random number are obfuscated in accordance with a first function (FN1( )). As an illustrative example, the first function (FN1( )) may represent an Exclusive OR (XOR) function in which the keying material, being a stored "secret" key or a derivation of the key such as a hash value of the key for example, and the random number undergo an XOR operation conducted in a bitwise manner. For example, the keying material (K) may be XOR'ed with the random number (RN), namely K XOR RN, to produce the challenge data. In another example, the keying material and/or random number may undergo other forms of reversible arithmetic or logical functions (e.g. ADD, SUB, MODULO, SHIFT, MULT, etc.) or the combination of such in a more complex form (e.g. AES, Triple-DES, etc.).

Upon receipt of the Challenge message, according to one embodiment of the disclosure, the data processing device accesses and decrypts a key stored in encrypted form in accordance with a second function (FN2( )). The encrypted key corresponds to the "secret" key stored in the storage device, where the keying material used to obfuscate the return value is based on the decrypted key. For instance, similar to keying material utilized by the storage device, the keying material produced by the data processing device may be the decrypted key itself or may be a derivation of the decrypted key such as a fixed-length hash value produced from the decrypted key. Thereafter, the keying material also is provided in a Response message prior to transmission.

The Response message includes information based on both (i) the keying material based on the decrypted key and/or (ii) a return value. This information, sometimes referred to herein as "response data," may be the result of the keying material and the return value being obfuscated using a third function (FN3( )) prior to transmission. According to one embodiment, the third function (FN3( )) is different from the first function (FN1( )). For instance, the third function (FN3( )) may be an arithmetic or logical operation that is stateless (e.g., any arithmetic or logical function that is 1:1, 1:n or 1:n mapping), or stateful (e.g. time varying, or any function whose output depends on states based on previous history) or the like. Also, the logical operations conducted by FN3( ) to produce the response data may vary for different Response messages.

The "return value" is information produced by conducting an operation on the challenge data in accordance with an inverse FN1 (FN1$^{-1}$( )) function. For this illustrative example, the return value should be equivalent to the random number, which is recovered by conducting the same XOR operation as conducted within the storage device to produce the challenge data.

In the event of a successful authorization (e.g. comparison of the return value with the random number and/or keying materials), the data processing device is provided access control of the storage device(s), with access to stored content within the storage device(s). This may be accomplished by the storage device altering its operating state from a default "locked" state to an "unlocked" state. This "unlocked" state may remain for all communications with the data processing device until the next state-changing event occurs. Otherwise, in the event of an unsuccessful authorization, the data processing device is precluded from accessing stored content within the storage device as the storage device remains in a "locked" state.

II. General Terminology

In the following description, certain terminology is used to describe features of the disclosure. For example, the term "device" generally represents electronics that support the receipt and/or transmission of information over any type of interconnect. More specifically, the terms "storage device" and "data processing device" are used herein. A "storage device" may include any device with information storage capabilities such as one or more physical disk drives (e.g. magnetic disk drives, magneto-optical disk drives, optical disk drives, self encrypted drives, etc.) that may be remotely located from the data processing device, or an external data store (e.g. a flash drive, an external hard disk drive, etc.). A "data processing device" comprises logic that is adapted to manage one or more storage devices, where the logic may be in the form of a circuit board upon which components for data processing are mounted. The circuit board may constitute a motherboard of the electronic device or a RAID (Redundant Array of Independent Disks) controller. Examples of the data processing device may include a computer (e.g., laptop, tablet, desktop, etc.), another type of consumer electronics (e.g., television, a set-top box, a content streaming player such a Roku® player, etc.) or electronics configured to support communications with the storage device (e.g., router, brouter, bridge, controller, access point, base station, etc.).

Herein, the term "logic" is generally defined as hardware, software and/or firmware. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

"Firmware" denotes software that controls functionality of the device. Examples of firmware include software pertaining to an operating system or Basic Input Output System (BIOS).

The term "keying material" generally refers to information associated with protected data such as a cryptographic (secret) key or information derived from the key such as a hash value produced by the key undergoing a one-way cryptographic hash function (e.g. a MD-based function, SHA-based function, etc.). The term "content" generally refers to stored information that may be sent over a network as one or more messages, where each message may be in the form of a packet, a frame, an Asynchronous Transfer Mode "ATM" cell, or any other series of bits having a prescribed format.

An "interconnect" is generally defined as one or more communication pathways established over one or more types of medium. The medium may be a physical medium (e.g., electrical wire, optical fiber, cable, bus traces, etc.), a wireless medium (e.g., air in combination with wireless signaling technology), or a combination thereof. The data transferred over the interconnect may be in accordance with a variety of communication protocols including, but not limited or restricted to SATA, SAS, PCIe, Ethernet or other wired protocols, or wireless protocols such as any type of IEEE 802.11 standards (e.g., IEEE 802.11ac, 802.11n, etc.), IEEE 802.3 standard, or the like.

The term "computerized" generally represents any corresponding operations that are conducted by hardware in combination with software and/or firmware. Also, the term "compare" generally means determining whether digital information associated with one item substantially corresponds or is identical to the digital information associated with another item.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Figure 1:
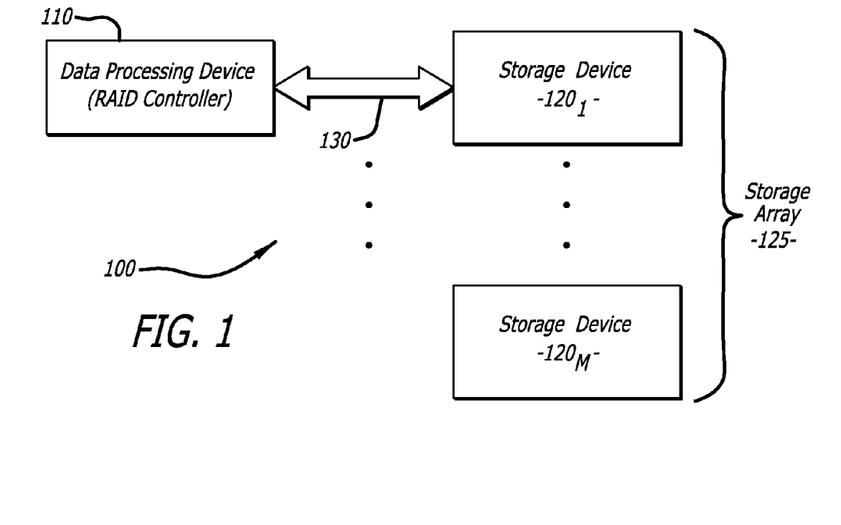
FIG. 1 is an exemplary embodiment of a network that comprises a data processing device conducting secure pairing operations with one or more storage devices.

Referring to FIG. 1, an exemplary embodiment of a network 100 that comprises a data processing device 110 in communication with one or more storage devices $120_1$-$120_M$ (M≥1) is shown. As illustrated, data processing device 110 is communicatively coupled to storage devices $120_1$-$120_M$ via interconnect 130. Hence, data processing device 110 may transmit messages over interconnect 130 to one or more storage devices $120_1$-$120_M$, and similarly, storage device(s) $120_1$-$120_M$ may transmit messages over interconnect 130 to data processing device 110.

According to one embodiment of the disclosure, data processing device 110 may be configured as a RAID controller that is adapted to manage storage devices $120_1$-$120_M$, such as one or more physical disk drives operating as a storage array 125 for example. Furthermore, as a RAID controller, data processing device 110 may present these drives for display as logical units. Hence, upon successful authorization of a corresponding storage device (e.g., storage device $120_i$, i≥1), the data processing device 110 is permitted access to that storage device $120_i$. Of course, it is contemplated that, in lieu of the data processing device 110 operating as a RAID controller, it is contemplated that intermediary logic in communication with the data processing device 110 and the storage devices $120_1$-$120_M$ may operate as the RAID controller.

Figure 2:
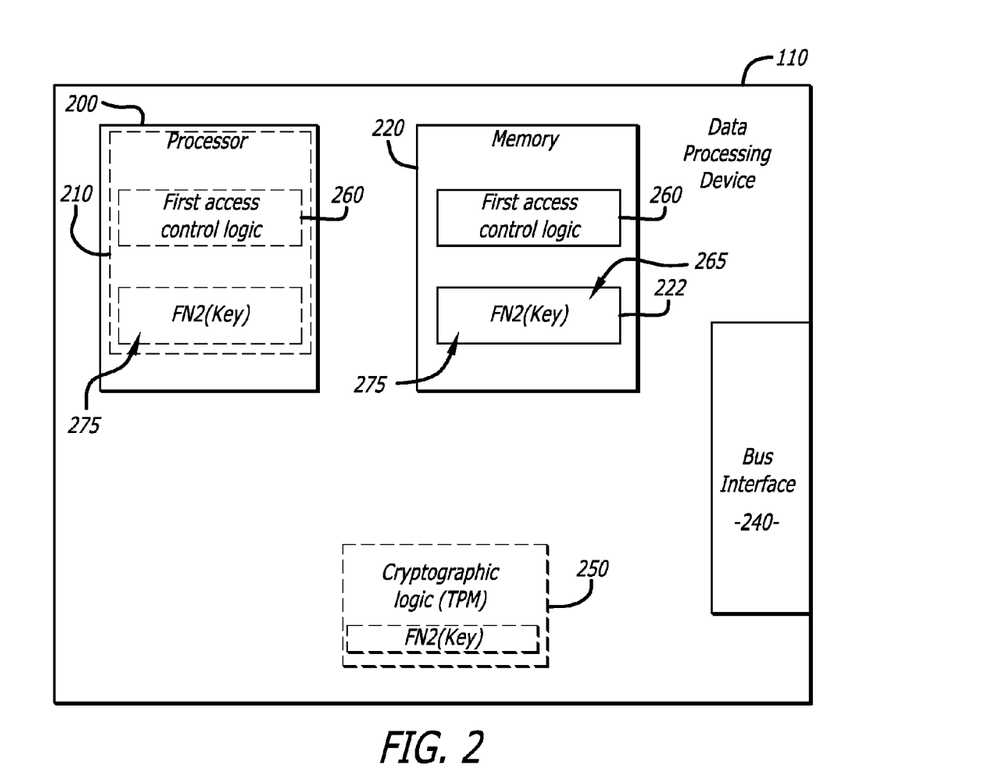
FIG. 2 is an exemplary embodiment of the data processing device implemented within the network of FIG. 1.

Referring to FIG. 2, an exemplary embodiment of data processing device 110 implemented within the network of FIG. 1 is shown. Herein, data processing device 110 comprises one or more processors 200, a non-volatile memory 220, bus interface logic 240 and optional cryptographic logic 250. According to one embodiment of the disclosure, some or all of these components 200, 220, 240 and/or 250 may be communicatively coupled together through one or more interconnects (not shown). Alternatively, according to another embodiment of the disclosure, these components may be integrated as part of a system-on-a-chip (SoC) implementation.

As shown in FIG. 2, bus interface logic 240 enables data processing device 110 to establish external communications with storage devices $120_1$-$120_M$ through interconnect 130 (e.g. Advanced Technology Attachment "ATA" bus, Ethernet cable, etc.), as shown in FIG. 1.

According to one embodiment of the disclosure, memory 220 includes a first access control logic 260 and at least one cryptographic key 265 encrypted in accordance with a second function (illustrated as "FN2(key) 275"). FN2(key) 275 may be stored within a register 222 being part of memory 220, where memory 220 may be located on a RAID controller card or a motherboard of data processing device 110, perhaps on a separate circuit board than the processor(s) 200. Produced from FN2(key) 275, the keying material 270 may be the key 265 itself or a derivation of the key 265 such as a hash value produced from key 265.

According to one embodiment of the disclosure, the first access control logic 260 is software that, when executed by one or more processor(s) 200, generates and transmits (i) one or more Access Request messages to request access to storage device(s) $120_1$-$120_M$ and/or (ii) a Response message in response to a corresponding Challenge message being part of the authorization process. Furthermore or in the alternative, first access control logic 260 may handle the retrieval of the encrypted key (FN2(key) 275) and/or extraction of information from an incoming Challenge message received via the bus interface 240 from a storage device responding to an Access Request message. Such extraction utilizes, at least in part, the keying material 270 based on the key 265 recovered from FN2(key) 275.

As described below in greater detail, the Access Request message is a message to request access to a particular storage device (e.g. storage device $120_1$), which commences the Challenge-Response authorization process described below. The Response message is a message that includes information for the storage device $120_1$ of FIG. 1 to confirm that the data processing device 110 is authorized to manage as well as access stored content within the particular storage device $120_1$.

As further shown in FIG. 2, an optional cryptographic logic 250, such as a Trusted Platform Module (TPM), may be implemented within the data processing device 110 to store the keying material 270 and assist in the cryptographic operations.

According to another embodiment of the disclosure, in lieu of storage within memory 220, first access control logic 260 and/or FN2(key) 275 may be implemented as part of the processor(s) 200 or stored within non-volatile (NV) memory within the processor(s) 200. For instance, first access control logic 260 may be implemented within on-chip local NV memory allocated to the Basic Input/Output Subsystem (BIOS). Additionally or in the alternative, FN2(key) 275 may be stored within local NV memory 210.

Figure 3:
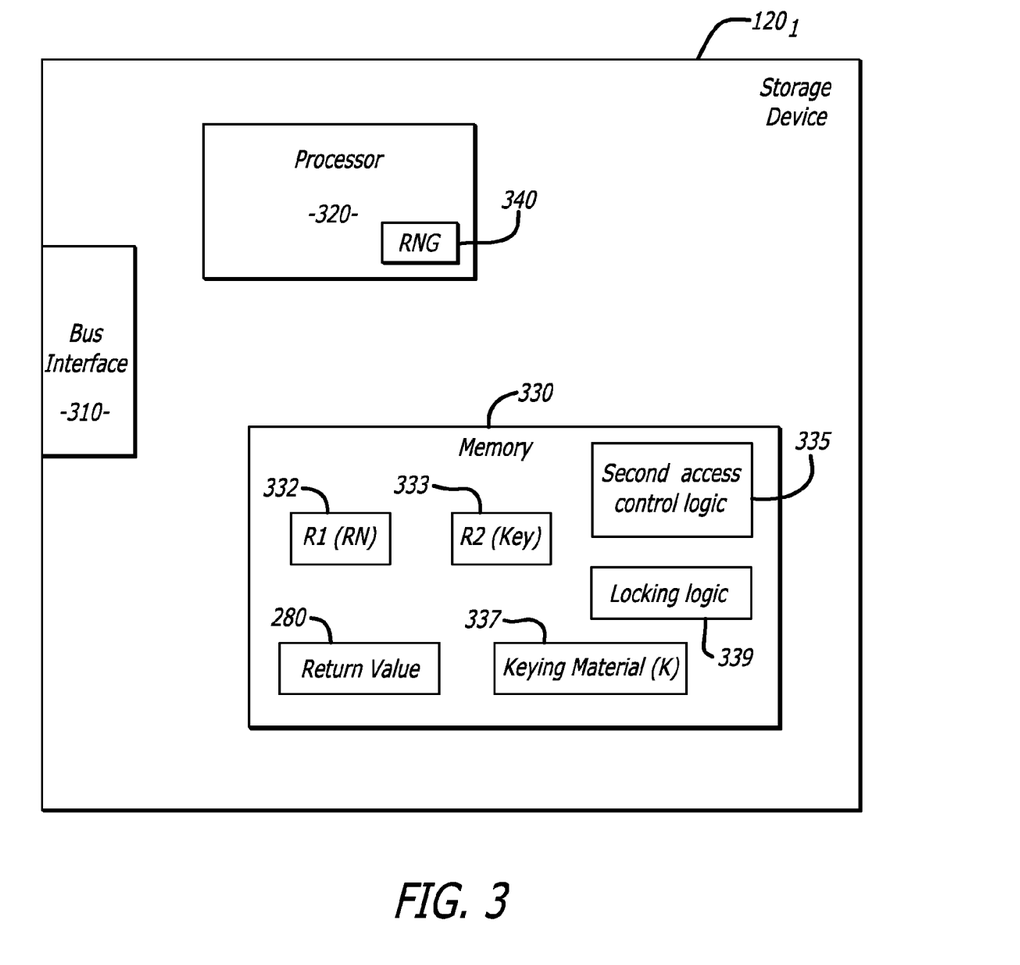
FIG. 3 is an exemplary embodiment of one of the storage devices implemented within the network of FIG. 1.

Referring now to FIG. 3, an exemplary embodiment of storage device $120_1$ implemented within network 100 of FIG. 1 is shown. Herein, storage device $120_1$ comprises bus interface logic 310, one or more processors 320 and a memory 330, and a random number generator (RNG) 340. According to one embodiment of the disclosure, some or all of these components 310, 220, 330 and/or 340 may be communicatively coupled together through one or more interconnects (not shown). Alternatively, according to another embodiment of the disclosure, these components may be integrated as part of a SoC implementation.

According to one embodiment of the disclosure, the RNG 340 may be implemented as any of a variety of number generators (e.g. pseudo random number generator "RNG", Arithmetic Pseudo RNG, Quasi RNG, Physical RNG, etc.) deployed within processor(s) 320 that generates at least one pseudo-random number (RN) in response to storage device $120_1$ undergoing a state-changing event. Alternatively, it is contemplated that the RNG 340 may generate at least one pseudo-random number (RN) upon receipt of an Access Request message by bus interface logic 310. Bus interface logic 310 enables storage device $120_1$ to establish external communications with the data processing device 110.

According to one embodiment of the disclosure, memory 330 includes a first data store 332, a second data store 333, second access control logic 335, keying material 337 and locking logic 339. Herein, first data store 332 may be implemented as a read-only register that stores the random number (RN) generated by the RNG 340. The second data store 333 may be implemented as a register that stores a cryptographic key that is used to produce keying material (K) 337 (e.g. where "K" is a hash value produced from the stored key).

According to this embodiment, keying material 337 may include one or more keys (or information derived from the key) that are pre-loaded into memory 330. The keying material 337 is used to obfuscate the random number (RN) generated by the random number generator 340 as well as recover and/or temporarily store a return value 280 associated with the response data included in a Response message sent from the data processing device 110 in response to the Challenge message, as described below.

The locking logic 339 is directed to control of an operating state of storage device $120_1$. As an illustrative example, upon the second access control logic 335 determining that the data processing device 110 is authorized to access stored content therein, the locking logic 339 may be configured to receive signaling from the second access control logic 335 to alter its default operating state from a "locked" to an "unlocked" state.

According to another embodiment of storage device $120_1$, although not shown, in lieu of storage within memory 220, second access control logic 335 and/or keying material 337 may be implemented as part of processor(s) 320 or stored within non-volatile (NV) memory within the processor(s) 320.

Figure 4:
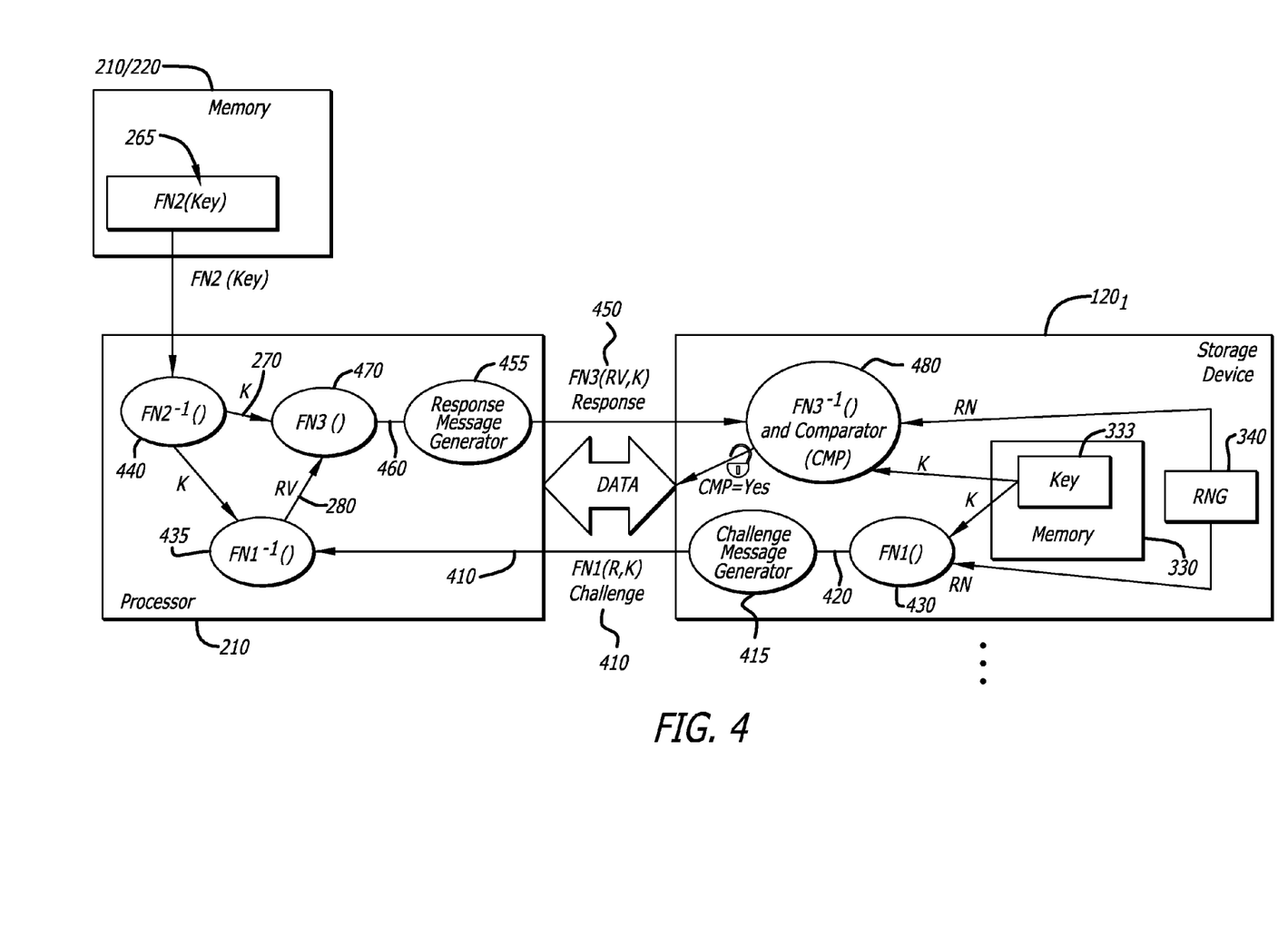
FIG. 4 is an exemplary embodiment of a message exchange for an authorization process between a data processing device and a storage device of FIG. 1 for hardened data store security.

FIG. 4 is an exemplary embodiment of a message exchange between the data processing device 110 and at least one storage device (e.g. storage device $120_1$ of FIG. 1). Herein, as collectively illustrated in FIGS. 2-4, in response to a state-changing event by storage device $120_1$, such as a reboot operation or an operation after a prescribed number of access retries for example, the RNG 340 generates a random number (RN) and stores the random number within the first data store 332 for subsequent use. Of course, it is contemplated that the random number generation may be configured periodically in lieu of an aperiodic nature as described above. The keying material 337 is pre-stored within storage device $120_1$ in an encrypted or plaintext format.

Upon receipt of an Access Request message (not shown) from the data processing device 110, in the event that the data processing device 110 has not been authorized subsequent to the most recent random number generation, logic 415 within the storage device $120_1$ generates a Challenge message 410. The Challenge message 410 includes challenge data 420 that is based on both the keying material 337 and the random number (RN). According to one embodiment of the disclosure, the challenge data 420 is a result produced from operations conducted on the keying material (key) 337 and the random number (RN) in accordance with a first function (FN1( )) 430. Herein, the first function (FN1( )) 430 is an XOR function to allow recovery of a value corresponding to the random number (RN) from the challenge data 420. However, it is contemplated that the first function (FN1( )) 430 may be any function that obfuscates the keying material 337 and random number (RN) for transmission while allowing the random number to be recovered.

The Challenge message 410, inclusive of the challenge data 420, is transmitted to the data processing device 110. Herein, the data processing device 110 relies on an inverse first function (FN1$^{-1}$( )) 435 to recover a return value (RV) 280 being equivalent to the random number (RN). According to one embodiment of the disclosure, where the first function (FN1( )) 430 is an XOR function, the inverse first function (FN1$^{-1}$( )) 435 is also an XOR function. Hence, by conducting a similar XOR operation on the challenge data 420 using the keying material 270, that is equivalent to the keying material 337 stored in storage device $110_1$ or derived from a key stored therein, the return value (RV) 280 is recovered.

As shown, according to one embodiment of the disclosure, the keying material 337 and the random number (RN) are obfuscated in accordance with the first function (FN1( )) 430. As an illustrative example, the first function (FN1( )) 430 may represent an Exclusive OR (XOR) operation where the keying material (K) 337 and the random number (RN) undergo an XOR operation conducted in a bitwise manner or with greater granularity, namely K XOR RN, to produce the challenge data 420. The challenge data 420 is part of the Challenge message 410 that is transmitted to the data processing device 110.

Upon receipt of the Challenge message 410, the data processing device 110 decrypts FN2(key) 275 in accordance with an inverse second function (FN2$^{-1}$( )) 440 to recover the key. Besides operating as a decryption function, FN2$^{-1}$( ) may also include functionality of producing the keying material 270 that is a derivative of the key 265 (e.g., FN2$^{-1}$( ) includes both decryption functionality and one-way hash functionality). Thereafter, logic 455 within data processing device 110 generates and transmits a Response message 450.

The Response message 450 includes information 460 based on both (i) the keying material (K) 270 and/or (ii) the return value (RV) 280. This information 460, sometimes referred to herein as "response data 460," may be the result of the keying material 270 and the return value (RV) 280 being obfuscated prior to transmission using a third function (FN3( )) 470. According to one embodiment, the third function (FN3( )) 470 may be different from the first function (FN1( )) 430. For instance, the third function (FN3( )) 470 may a mixture of arithmetic or logical functions that are stateful or stateless. Also, at different times and for generation of different response data 460, FN3( ) 470 may operate differently so that the keys cannot be detected through analysis of multiple samples of the response data 460. For example, different degrees of shifting may occur based on time, monitored count values, content within the return value (RV) 280, or the like. Moreover, different logical functions (e.g. SHIFT, ADD, etc.) may be used depending on time, monitored count values, content within the return value (RV) 280, or the like.

According to one embodiment of this disclosure, one "stateful" Challenge-Response scheme involves the data processing device introducing additional data (e.g. another random number) that is sent to the storage device. The additional data is saved for the next challenge event. The benefit of this stateful Challenge-Response scheme is that it will be increasingly difficult for the interloper to ever collect all the possible challenge-response combinations because the content within subsequent Challenge and Response messages will vary based on previous exchanges.

Another example of a "stateful" Challenge-Response scheme involves changing the response data based on previous history. In addition to returning the return value XOR'ed with the current key, the data processing device 110 generates a new key randomly (new_RN), which is XOR'ed with the current Return Value. The XOR'ed result is returned to the storage device $120_i$. The storage device $120_i$, in addition to verifying the current return value prior to placement in an unlocked state to permit access thereto or continuing placement in the unlocked state, also saves the new random key (new_RN) to be used as the key for the next challenge and response cycle.

For failsafe reason, it is important to have a backup mechanism that allows both the data processing device 110 and the storage device 120$_i$ to revert back to the original saved keys. One method to consider is that if unlock fails after "j" retries, then restart everything with the original saved keys.

The return value (RV) 280 constitutes information produced by conducting an operation on the challenge data 420 in accordance with an inverse FN1 function (FN1$^{-1}$( )) 435. For this illustrative example, the return value (RV) 280 should be equivalent to the random number (RN), which is recovered by conducting an inverse function (FN1$^{-1}$( )) 435 of the FN1 function conducted to produce the challenge data 420 from the keying material (K) 337 and the random number (RN).

In the event of a successful authorization (e.g. recovery of the return value (RV) by inverse function FN3$^{-1}$( ) 480 and comparison of the return value (RV) 280 with the random number (RN) and/or keying materials (K)), the data processing device is provided access to the storage device 120$_1$. This may be accomplished by the storage device 120$_1$ altering its operating state from a default "locked" state to an "unlocked" state. This "unlocked" state may remain for communications with the data processing device 110 until the next state-changing event occurs. Otherwise, in the event of an unsuccessful authorization, the data processing device 110 is precluded from accessing stored content within the storage device as the storage device 120$_1$ remains in a "locked" state.

Figure 5:
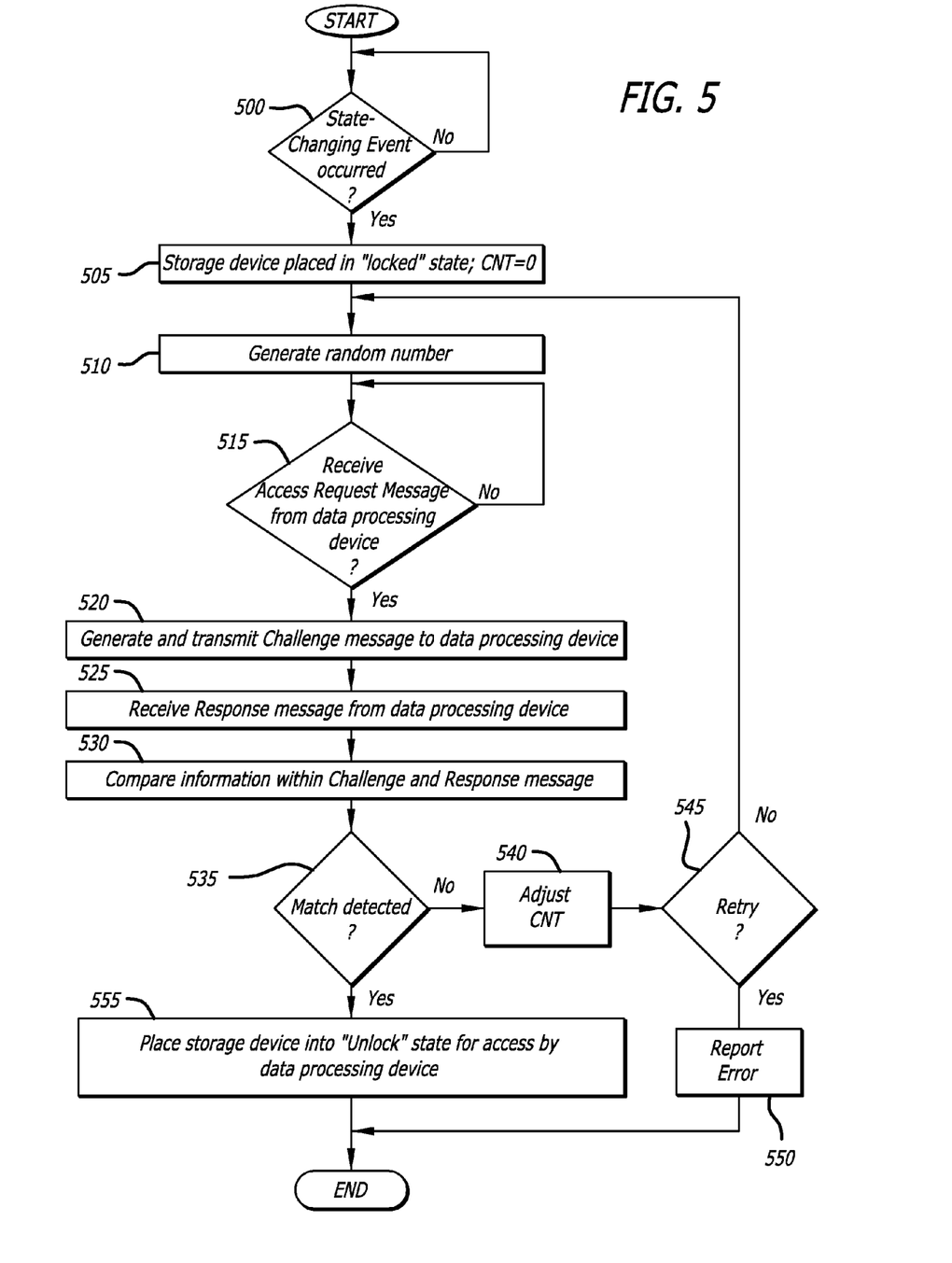
FIG. 5 is a general flowchart illustrating operations conducted by a storage device during the authorization process prior to placement of the storage device into an unlocked state.

Referring now to FIG. 5, a general flowchart illustrating operations of a security mechanism for a storage device (e.g., storage device 110$_1$ of FIGS. 1 and 4) to automatically determine whether a data processing device is permitted access thereto. Herein, in response to a state-changing event, the storage device is placed into a locked state and a count value (CNT) is set to an initial value (e.g. CNT=0) as set forth in blocks 500 and 505. Also, a RNG within the storage device generates a random number that is subsequently stored by the storage device (block 510).

Upon receipt of an Access Request message from the data processing device, the storage device generates and transmits a Challenge message to that data processing device (blocks 515 and 520). Herein, the Challenge message includes challenge data that is based on both the random number (RN) and the keying material. For instance, the challenge data may be the result of a XOR operation conducted on both the random number and the keying material.

Upon receipt of a Response message from the data processing device, information associated the response data within the Response message is compared the random number and/or keying material used to produce the challenge data (blocks 525 and 530). If no match is detected, a retry condition may be activated in which CNT is adjusted (e.g. incremented or decremented) and the adjusted CNT value is not greater (or lesser) than a prescribed retry threshold (X) as set forth in blocks 535, 540 and 545. In response to a retry condition, blocks 510-535 are repeated. Otherwise, an error is reported (block 550). Of course, if a match is detected, the storage device is placed into an Unlocked state (block 555).

Figure 6:
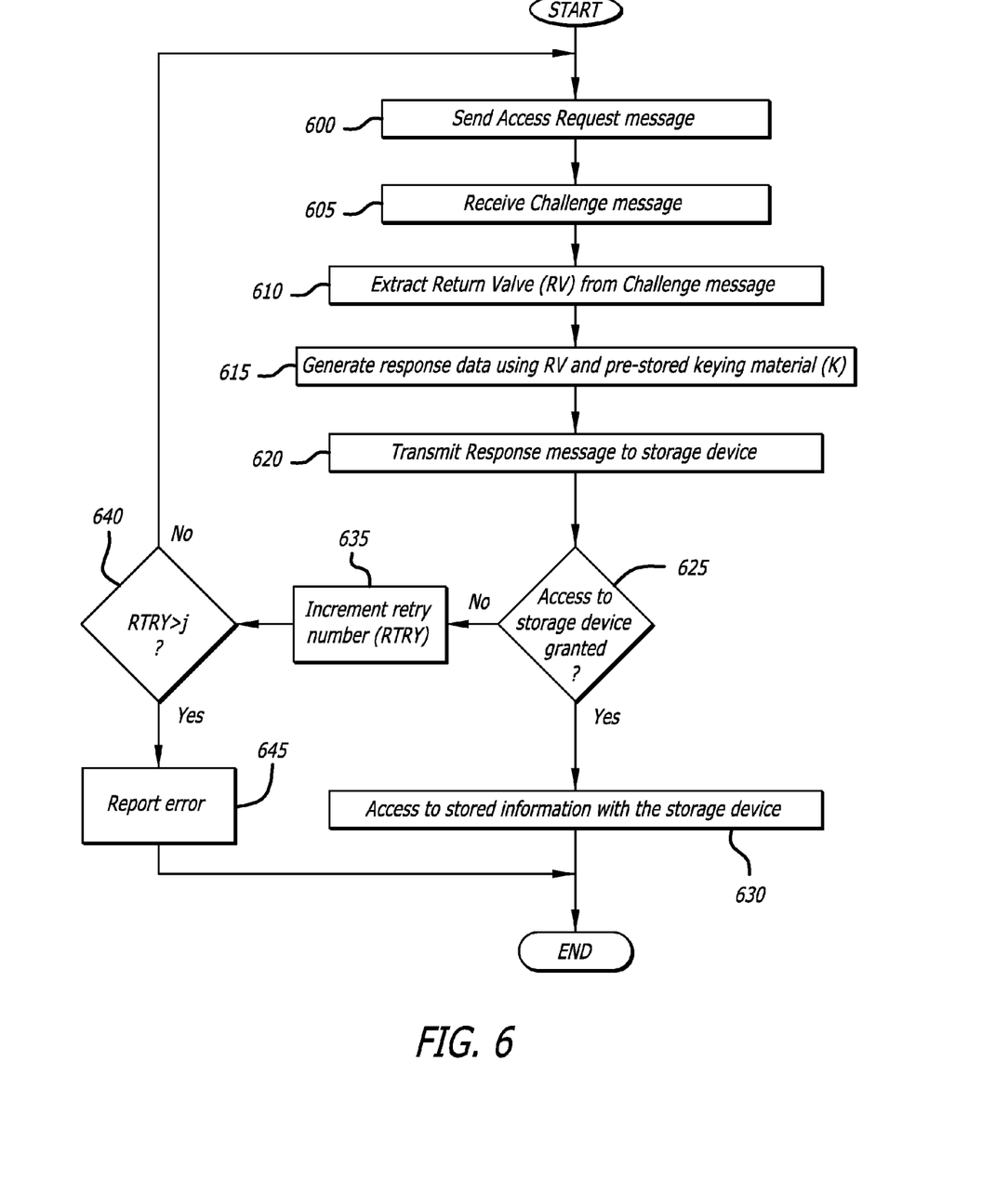
FIG. 6 is a general flowchart illustrating operations conducted by a data processing device during the authorization process prior to placement of the storage device into an unlocked state.

FIG. 6 is a general flowchart illustrating operations by a data processing device for a security mechanism in automatically requesting and securely gaining access to a storage device. Herein, an Access Request message is sent to the electronic device associated with the storage device (block 600). Subsequent to transmission of the Access Request message and in response thereto, the data processing device receives a Challenge message (block 605). The return value (RV), which corresponds to the random number (RN), is extracted from the Challenge message (block 610). Both the return RV along with the keying material undergoes a function to produce response data which is included to the Response message sent to the storage device (blocks 615 and 620). If a match is determined between the return value (RV) and the random number (RN), the data processing device now has access to the stored content of the storage device in order to control operations of the storage device (blocks 625 and 630)). However, if no match was detected, access to the stored content of the storage device is denied to the data processing device (block 625). This may cause retry such as where the number of retries is less than a prescribed number (j, where j≥1) as set forth in blocks 635 and 640. No further retries are provided, where the number of retries (RTRY) is greater than "j" (block 645).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the foregoing claims and their equivalents. The descriptions are thus to be regarded as illustrative instead of limiting.

What is claimed is:

1. A computerized method comprising:
    transmitting, by a storage device, a first message to a data processing device, the first message comprises information generated internally within the storage device, wherein the information generated internally within the storage device is based on a random number generated by a random number generator residing in the storage device and a first keying material, the first keying material being either a key or information generated based on the key;
    receiving, by the storage device, a second message in response to the first message, the second message comprises information generated using at least a portion of the information generated internally within the storage device;
    recovering information from the second message by the storage device, the information from the second message comprises information generated using at least a portion of the information generated internally within the storage device;
    comparing, by the storage device, the information recovered from the second message with at least the portion of the information generated internally within the storage device, wherein the storage device authenticates the data processing device upon determining that the information recovered from the second message compares to at least the portion of the information generated internally within the storage device; and
    altering, by the storage device, an operating state of the storage device from a locked state to an unlocked state when the information recovered from the second message compares with at least the portion of the information generated internally within the storage device.

2. The computerized method of claim 1, wherein the information is a result produced from operations conducted on the random number and the first keying material in accordance with a first function.

3. The computerized method of claim 2, wherein the first function is an Exclusive OR (XOR) function.

4. The computerized method of claim 2, wherein the information associated with the second message is based on a return value that is equivalent to the random number generated by the random number generator and a second keying material that is equivalent to the first keying material and is recovered from a prestored cryptographic key encrypted in accordance with a second function by conducting an inverse of the second function on the prestored cryptographic key, the second keying material being either a key or information generated based on the key.

5. The computerized method of claim 4, wherein the information associated with the second message is obfuscated prior to receipt using a third function.

6. The computerized method of claim 5, wherein the third function is different than the first function.

7. The computerized method of claim 6, wherein the third function is a logical function that includes a Shift function.

8. The computerized method of claim 5, wherein the recovering of the return value and the second keying material comprises conducting an inverse of the third function.

9. The computerized method of claim 8, wherein the comparing the information recovered from the second message with at least the portion of the information generated internally within the storage device comprises comparing the return value to the random number and the information recovered from the second message compares at least to the portion of the information generated internally within the storage device when the return value compares to the random number.

10. The computerized method of claim 1, wherein the storage device, when placed in the unlocked state, allows one or more devices to control the storage device including accessing stored content within the storage device.

11. The computerized method of claim 1, wherein the storage device is a hardware drive.

12. A storage device, comprising:
   a processor;
   a random number generator; and
   a memory in communication with the processor and the random number generator, the memory comprises an access control logic that is communicatively coupled to the random number generator, the access control logic being configured, upon execution by the processor, to (i) transmit a first message that comprises information generated based on a random number generated by the random number generator and a first keying material being either a key or information generated based on the key, (ii) receive a second message in response to the first message, the second message comprises information generated based, at least in part, on at least the random number, (iii) recover information from the second message, the recovered information comprises information generated using at least pre-stored keying material and a return value being based on the random number, (iv) compare the return value from the recovered information with the random number to determine whether a first device providing the second message is authorized to access stored content within the storage device, and (v) alter an operating state of the storage device from a locked state to an unlocked state upon the return value matching the random number, the unlocked state allows the first device of one or more devices to access the stored content within the storage device while the locked state precludes a device of the one or more devices that is unauthorized from accessing the stored content.

13. The storage device of claim 12, wherein the information associated with the random number and the first keying material includes a result produced from operations conducted on the random number and the first keying material in accordance with a first function.

14. The storage device of claim 13, wherein the first function is an Exclusive OR (XOR) function.

15. The storage device of claim 13, wherein the information from the second message is based on a return value that is equivalent to the random number and a second keying material that is equivalent to the first keying material and is recovered from a pre-stored cryptographic key encrypted in accordance with a second function that is different than the first function.

16. The storage device of claim 15, wherein the information associated with the second message is further obfuscated based on a third function.

17. The storage device of claim 16, wherein the third function is a logical function that includes a Shift function.

18. The storage device of claim 15, wherein the access control logic to compare the return value from the recovered information with the random number and the information recovered from the second message and determines a comparison when the return value compares to the random number.

19. The computerized method of claim 11, wherein the hardware drive corresponds to either a physical disk drive or a flash drive.

* * * * *